United States Patent [19]

Hutto

[11] Patent Number: 4,523,604
[45] Date of Patent: Jun. 18, 1985

[54] DIVERTER VALVE

[75] Inventor: Joe D. Hutto, Indianapolis, Ind.

[73] Assignee: Masco Corporation of Indiana, Taylor, Mich.

[21] Appl. No.: 474,804

[22] Filed: Mar. 14, 1983

[51] Int. Cl.³ ............................................. F16K 11/02
[52] U.S. Cl. .................................. 137/102; 137/107; 251/175
[58] Field of Search .......... 137/102, 107, 119, 625.47; 251/175; 261/DIG. 75, 62

[56] References Cited

U.S. PATENT DOCUMENTS

| | | | |
|---|---|---|---|
| 2,888,952 | 6/1959 | Klaren et al. | 137/625.11 |
| 3,103,948 | 9/1963 | Salmen | 251/175 |
| 3,296,026 | 1/1967 | Long | 137/329.05 |
| 3,424,185 | 1/1969 | Lansky et al. | 137/102 |
| 3,538,953 | 11/1970 | Berger | 137/625.46 |
| 3,709,256 | 1/1973 | Gore et al. | 137/625.47 |
| 3,826,274 | 7/1974 | Moen | 137/119 |
| 3,840,048 | 10/1974 | Moen | 137/625.41 |
| 3,906,990 | 9/1975 | Nelson | 137/359 |
| 4,073,471 | 2/1978 | Lehtinen | 251/176 |
| 4,078,764 | 3/1978 | Haffner | 251/175 |
| 4,241,754 | 12/1980 | Moen | 137/119 |
| 4,355,653 | 10/1982 | Credle, Jr. | 137/102 |

FOREIGN PATENT DOCUMENTS 2096285 10/1982 United Kingdom ............... 137/102

Primary Examiner—Martin P. Schwadron
Assistant Examiner—James R. Shay
Attorney, Agent, or Firm—Steven L. Permut; Malcolm L. Sutherland; Leon E. Redman

[57] ABSTRACT

A diverter valve assembly includes a valve body rotatably mounted in a cavity of a housing. The housing has an inlet connected to a water supply, a tub spout outlet, and a showerhead outlet. The showerhead outlet is connected to a showerhead via a riser. The valve body has a jet orifice in communication with the inlet and alignable with one of the outlets. The valve body also has a flange which rotatably seats an elastomeric sleeve. The sleeve, when the jet orifice is aligned with an outlet, is aligned with the other outlet. The sleeve and flange form a pressure chamber which is in communication with the inlet. When the sleeve is aligned over the tub spout outlet, and the water supply is turned on, the back pressure caused by the showerhead flexes the sleeve to seal the tub spout orifice. When the water supply is turned off, the elastomeric sleeve relaxes to allow water to drain from the riser to the tub spout without the valve assembly changing position.

13 Claims, 8 Drawing Figures

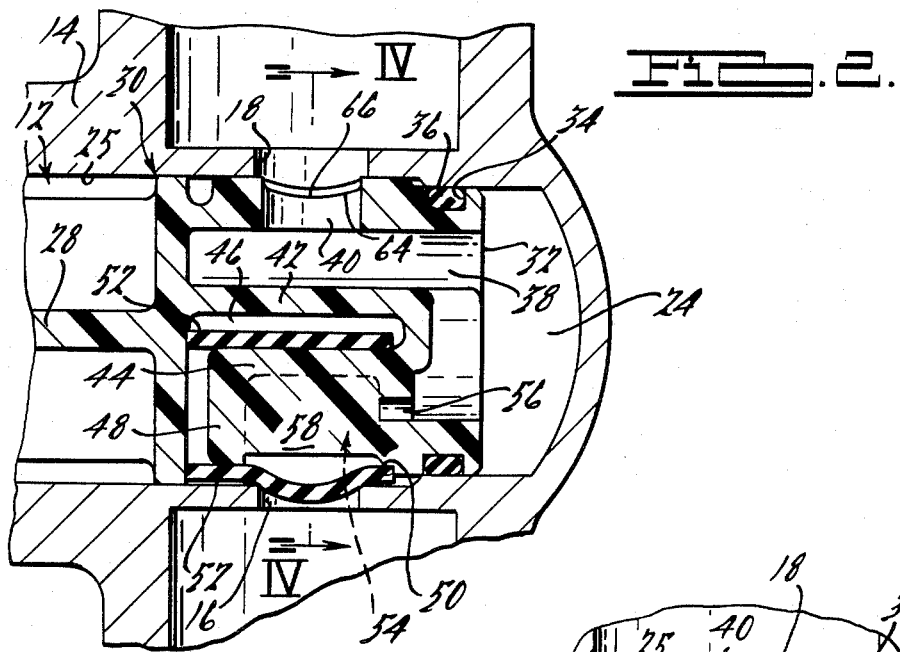
FIG. 2.
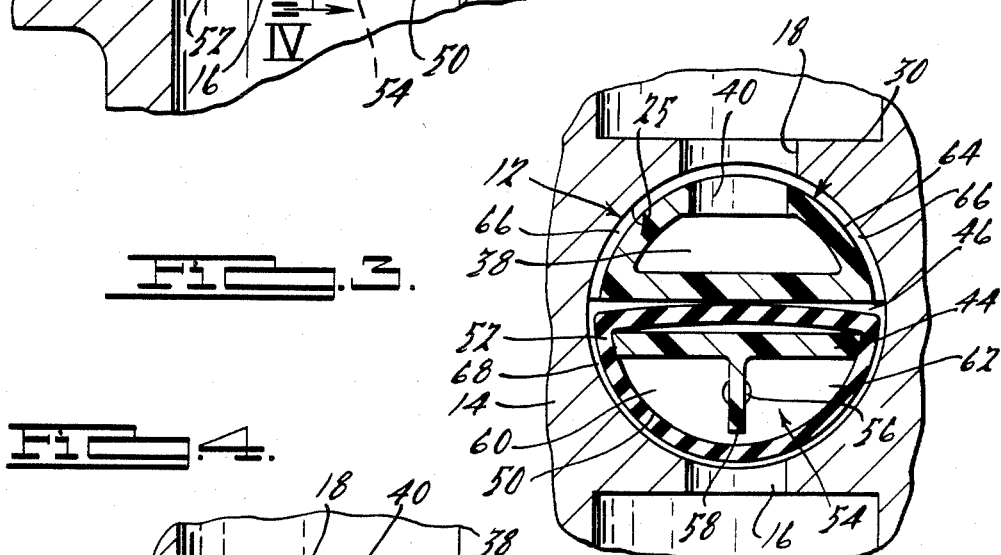
FIG. 3.
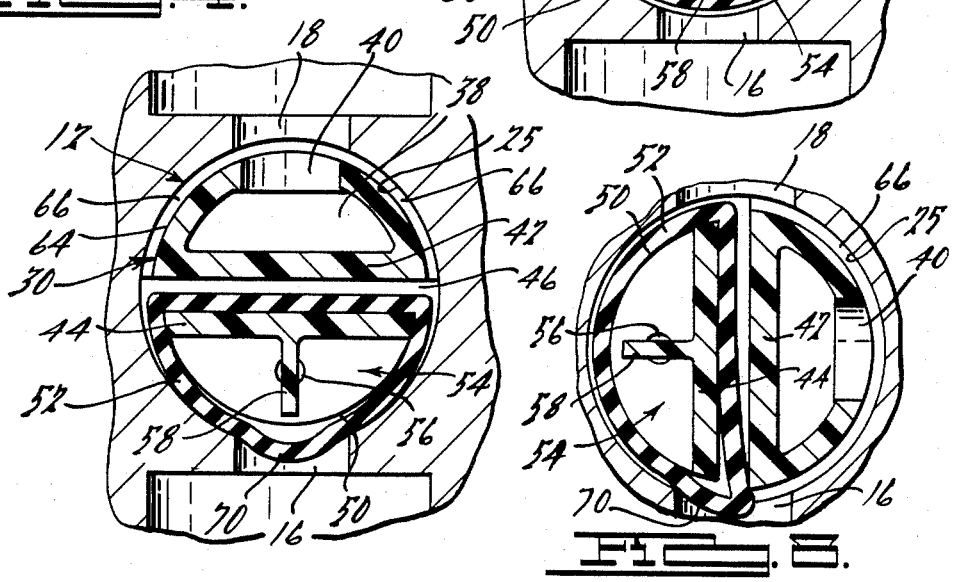
FIG. 4.
FIG. 5.

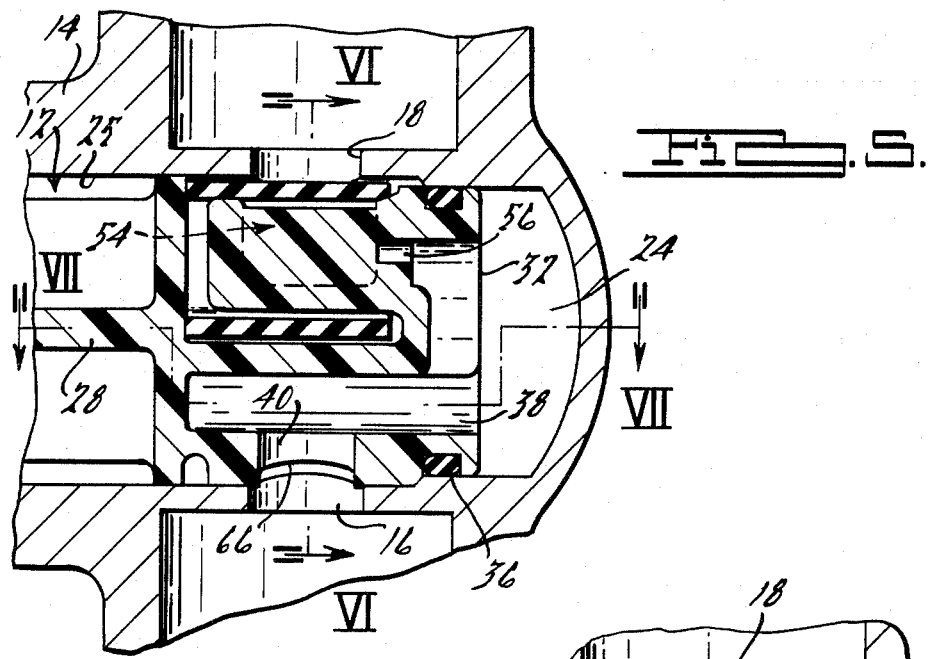
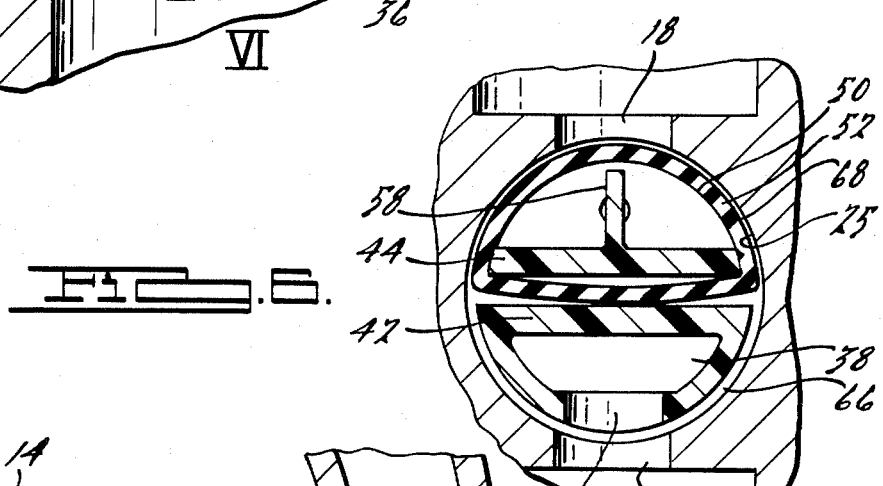
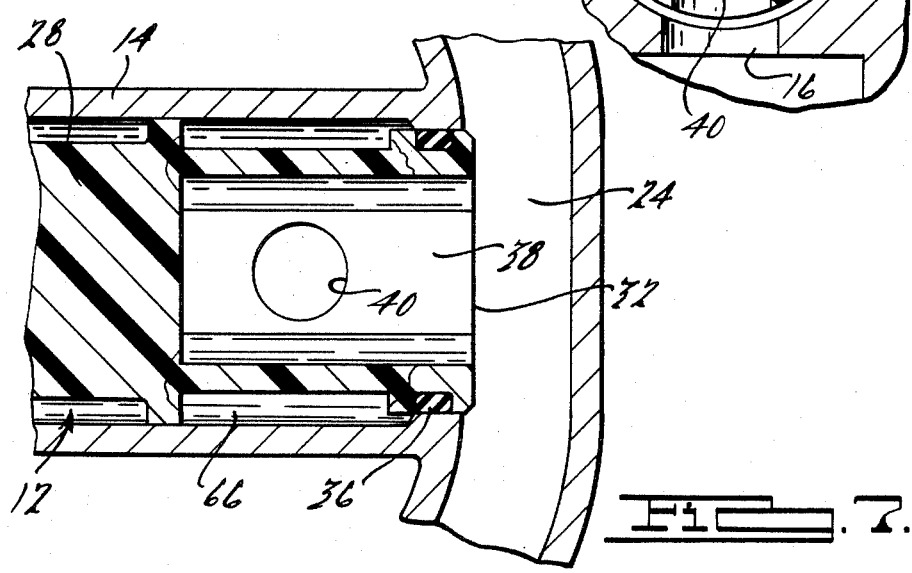

DIVERTER VALVE

TECHNICAL FIELD

The invention relates to valves and more particularly to diverter valves for diverting water to either a tub spout or showerhead.

DISCLOSURE INFORMATION

Diverter valves are often used in built-in shower units where water can flow through either the tub spout or the showerhead depending on the position of the diverter valve. Diverter valves are either incorporated within the tub spout or a are separate assembly usually mounted on a wall over the bathtub.

The diverter valve incorporated within the tub spout shuts off the tub spout such that water is directed through a riser up to the showerhead. The pressure of the water supply maintains the diverter valve in a closed position. When the water pressure ceases, the diverter valve falls down to the open position and allows water to drain out of the tub spout.

The diverter valve that is a separate assembly often remains in the closed position after the water supply is shut off. This diverter valve usually incorporates a seal which slides against an inside cavity until it seals one of two outlets such that water is directed through the remaining open outlet. This diverter valve is subject to wear due to the rubbing of the seal against the cavity wall when it moves between positions. In addition, the diverter valve when worn may allow a slow leakage of water from a filled shower riser even though the water supply valves are turned off. Consequently, a person may be fooled into believing that the water supply valves need repair because of a slow persistent leakage through the tub spout.

A diverter valve is needed that provides increased durability of the seal and provides relatively fast drainage from the shower riser when the water supply is turned off.

SUMMARY OF THE INVENTION

In accordance with the invention, a diverter valve includes a housing defining a cavity with a first outlet leading to a tub spout, a second outlet leading to a showerhead, and an inlet operably connected to a valved water supply. A valve stem is rotatably mounted within the cavity between a first and second position. The valve stem has a longitudinal eccentrically positioned flange with an elastomeric sleeve rotatably mounted about the flange. The diverter valve has a jet orifice which can communicate the inlet to the outlet leading to the showerhead when in the first position.

The flange and the sleeve define a pressure chamber such that when the diverter valve is in the first position and the pressure within the chamber is above a predetermined minimum, the seal is forced radially outwardly and closes the outlet leading to the tub spout.

The pressure within the chamber is caused by a restriction in the showerhead outlet which creates a back pressure in the pressure chamber above the predetermined minimum when the diverter valve is in the first position.

The diverter valve has a circumferential groove which extends from the seal to the second outlet leading to the showerhead. When the water supply is shut off and the back pressure ceases, the elastomeric seal relaxes and breaks the seal to the outlet leading to the tub spout. Water within a riser leading to the showerhead drains back through the second outlet, through a passage defined by the groove, passes by the relaxed seal, and exits through the outlet leading to the tub spout.

The diverter valve can be rotated to a second position such that the jet orifice is aligned over the first outlet and the seal is positioned adjacent the second outlet leading to the showerhead. When the water supply is on, the jet orifice shoots water to the first outlet. In addition, air is aspirated into the showerhead, down the riser, through the second outlet, passing by the relaxed seal, and through the passage to aerate water exiting to the first outlet.

In broader terms, the invention is directed to a diverter valve having a housing with a cavity. The valve element is movably mounted in the cavity between a first and second position. The valve element is an elastomeric sleeve rotatably mounted about a valve seat. The cavity has a first outlet, a second outlet, and an inlet. The valve element when in a first position is adjacent to the first outlet and is pressure responsive to fluid pressure in the cavity such that above a predetermined pressure the valve member seals the first outlet and fluid flowing into the cavity from the inlet is directed through the second outlet.

Another aspect of the invention is directed to a housing having a cavity with an inlet, an unrestricted lower outlet, and a restricted higher outlet. The valve body defines a passage between the inlet and one of the outlets. The valve body mounts a valve element. The valve body is movable to a first position such that the valve element is adjacent the unrestricted lower outlet and the passage communicates the inlet to the restricted higher outlet. The restricted outlet creates a back pressure within the cavity when fluid flows therethrough. The valve element is responsive to the back pressure to seat against and seal the unrestricted outlet thereby diverting flow from the inlet to the restricted outlet. The valve element breaks the seal when the back pressure ceases with the valve body remaining in the first position.

BRIEF DESCRIPTION OF THE DRAWINGS

Reference now will be made to the accompanying drawings in which:

FIG. 2 is a fragmentary enlarged segmented view of the diverter valve shown in FIG. 1 when pressurized water supply is flowing therethrough;

FIG. 3 is an enlarged cross-sectional view taken along lines III—III in FIG. 1;

FIG. 4 is a cross-sectional view taken along the lines IV—IV in FIG. 2;

FIG. 5 is an enlarged segmented view of the diverter valve rotated to its second position;

FIG. 6 is a cross-sectional view taken along lines VI—VI in FIG. 5;

FIG. 7 is a cross-sectional view taken along line VII—VII in FIG. 5;

FIG. 8 is a view similar to FIG. 4 showing the valve being turned from the first position shown in FIG. 4 when the water supply is on.

DETAILED DESCRIPTION OF THE PREFERRED EMBODIMENT

Figure 1:
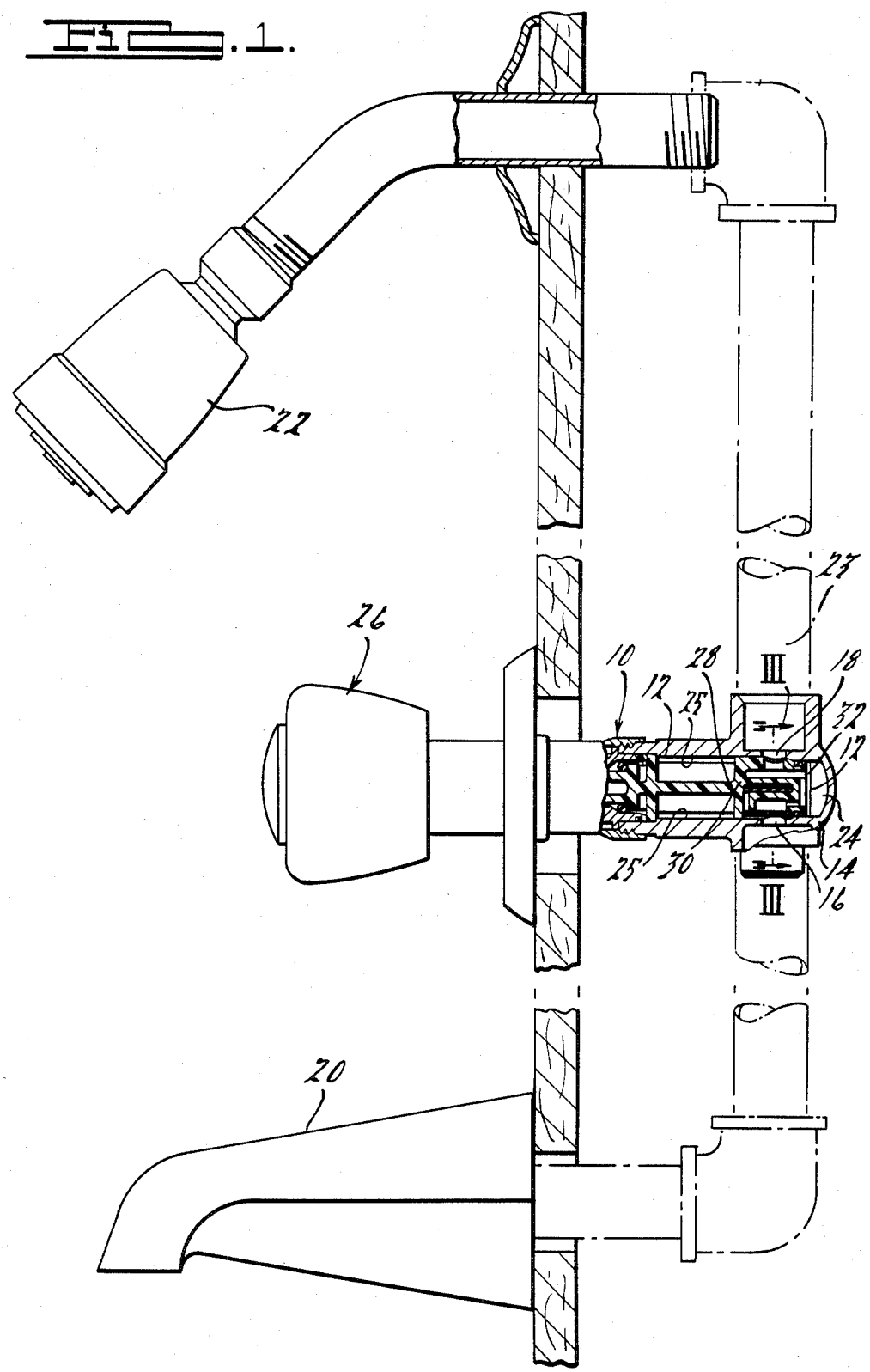
FIG. 1 and side elevational and partially segmented view of a diverter valve assembly for a showerhead and tub spout assembly.

Referring to FIG. 1, a diverter valve assembly 10 is rotatably mounted within cavity 12 of a housing 14. The housing has a first outlet 16 operably connected to a tub spout 20 and a second outlet 18 operably connected to a showerhead 22 via a riser 23. Each outlet 16 and 18 extends through the side wall 25 of cavity 12. The water supply can be turned off and on in a conventional manner by either a single handle mixer or two valves which separately control hot and cold water.

The valve assembly 10 includes a handle 26 operably connected to a valve stem 28 that is rotatably mounted in the cavity 12 for rotation between two positions. The valve stem 28 has an enlarged end section 30. Enlarged section 30 has an axial facing end 32 which faces the inlet 24. As more clearly shown in FIG. 2, the rear axial end 32 has a circumferential groove 34 which seats an O-ring 36 which forms a circumferential seal about cavity 12. The axial end 32 has a first passage 38 which leads to a jet orifice 40. The orifice 40 is aligned with the outlet 18 connected to riser 23 when the diverter valve assembly 10 is in its first position as shown in FIGS. 1, 2, 3 and 4. A central wall 42 defines, in part, the passage 38.

A flange member 44 axially extends inwardly from the end 32 and is spaced from wall 42 to form a space 46 therebetween. The flange 44 has a radially extending wall 48 which in conjunction with shoulder 50 seats an elastomeric sleeve 52. The flange 44 and sleeve 52 form a pressure chamber 54 which is in fluid communication with inlet 24 via a pilot hole 56 through end 32. As clearly shown in FIG. 3, the chamber 54 is divided by a vertical support wall 58. Pilot hole 56 spans the wall 58 such that it is in communication with each section 60 and 62 of chamber 54.

When the water supply is turned on, water flows into the inlet 24 and through passage 38, orifice 40, and outlet 18. The showerhead 22 has a restriction which creates back pressure within the riser 23 and then back through the inlet 24. Back pressure and water supply pressure is transmitted through pilot hole 56 into pressure chamber 54. The back pressure causes the sealing sleeve 52 to bulge outwardly and seat against and seal the outlet 16 leading to the tub spout as shown in FIGS. 2 and 4.

Referring now to FIGS. 3 and 4, the enlarged section 30 has a circumferential recessed groove 64 which forms a clearance or passage 66 between it and the wall 25 of cavity 12. This passage communicates outlet 18 with the elastomeric sleeve 52. When the water supply is shut off and the pressure within the inlet 24 drops, the pressure drop is communicated to chamber 54 which allows the elastomeric sleeve 54 to unseat from outlet 16. Water trapped within the riser 23 is allowed to drain through outlet 18, through passage 66, and by the clearance 68 between relaxed sleeve 52 and housing 14 and exit through outlet 16 to the tub spout 20. The valve 10 remains in the first position after the sleeve 52 is unseated from outlet 16.

Normally, the diverter valve can rotate within the cavity 12 without putting wear on elastomeric sleeve 52 since the sleeve 50 is not normally in contact with the cavity wall 25. In addition, as shown in FIG. 8, if the valve assembly 10 is rotated when water pressure is within chamber 54 and sleeve 50 is seated in outlet 16 as shown in FIG. 4, the wall 44 slides against the sleeve 52 until the bulged or sealing section 70 of the sleeve 52 is lifted out from outlet 16 by wall 42. When the bulged section 70 is lifted out, the seal is broken and sleeve 52 relaxes. The lifting of section 70 prevents the section 70 from being sheared against the edge of the outlet 16. The minimization of wear of sleeve 52 and the low risk of shearing the sleeve 52 provides for a long lasting valve seal.

When the valve assembly is rotated 180° to the second position as shown in FIGS. 5, 6 and 7, the jet orifice 40 is aligned with outlet 16 and elastomeric seal sleeve 50 is positioned below outlet 18. When the water supply is turned on, water flows through inlet 24, passage 38, orifice 40 and outlet 16. The flow is unrestricted once it passes orifice 40. The tub spout 20 does not provide any restriction.

Since there is no back pressure from the tub spout 20, the pressure within the inlet 24 is insufficient to create any bulging of sleve 52. Therefore the sleeve 52 remains in its relaxed position as shown. In addition, the jetting of water through the jet orifice 40 through outlet 16 creates a low pressure that draws in air from the showerhead 22, through riser 23, outlet 18, clearance 68, and passage 66 as shown in FIG. 6. The air being aspirated through showerhead 22 and through riser 23 aerates the water exiting outlet 16 and passing through the tub spout 20.

As described above, the diverter valve assembly 10 has a plurality of advantages. Firstly, the elastomeric sleeve 50 fully seals outlet 16 due to pressure. The seal is not dependent on any moving parts or a fit between parts thus creating a more positive and dependable sealing action.

Secondly, when water is shutoff, the sleeve 52 relaxes which allows drainage of any water within riser 23. The substantial drainage empties the riser 23 within a short period of time to prevent anyone from incorrectly believing that a water supply valve is leaking. This drainage eliminates the risk of unnecessary repairs to supply valves.

Thirdly, when the diverter valve assembly is in its second position, the water is directed to flow through the lower outlet 16 independently of the seal to outlet 18. There is no leakage through the showerhead 22 even though outlet 18 is not sealed.

Fourthly, the valve is constructed to provide aspiration of air through the showerhead which aerates the water passing to tub spout 20.

Fifthly, the sleeve 50 has a long life. It does not wear against the wall 65 of cavity 12 nor does it shear against the edge of either outlet.

Variations and modifications of the present invention are possible without departing from its scope and spirit as defined by the appended claims.

The embodiments of the invention in which an exclusive property or privilege is claimed are defined as follows:

1. A diverter valve characterized by:
   a housing having a cavity with a first outlet, a second outlet, and an inlet;
   a valve element movably mounted in said cavity between a first position and second position;
   said valve element being an elastomeric sleeve rotatably mounted about a valve seat;
   said valve seat being operably rotatable within said cavity;
   said outlets being through the side wall of said cavity and said inlet being at an end thereof;

said valve member when in said first position being adjacent said first outlet and being pressure responsive to fluid pressure in said cavity such that over a predetermined pressure in said cavity, said sleeve seals said first outlet and fluid is directed through said second outlet from said inlet; and said first outlet being lower than said second outlet such that when fluid pressure in said cavity is below a predetermined amount, said valve element breaks its seal with said first outlet and allows fluid to drain from said second outlet to said first outlet.

2. A diverter valve as defined in claim 1 wherein:

said valve seat comprises a longitudinal eccentrically positioned flange;

said sleeve is mounted about said flange; and said flange and said sleeve define a pressure chamber in communication with said cavity by means of a pilot hole through said flange.

3. A diverter valve characterized by:

a housing having a cavity with an inlet;

an unrestricted lower outlet and a restricted higher outlet;

a valve body defining a first passage between said inlet and one of said outlets;

a valve element mounted to said valve body;

said valve body movable between a first position and second position;

said valve body, when in said first position, said valve element adjacent said unrestricted outlet; and said valve element being pressure responsive to fluid pressure in said cavity such that over a predetermined pressure said valve element seals said unrestricted outlet and directs fluid through said second outlet from said inlet and when said pressure is less than said predetermined amount, said valve elements unseats and opens up said unrestricted outlet with said valve body remaining in said first position.

4. A diverter valve as defined in claim 3 further characterized by:

said valve body having a second passage communicating said restricted outlet with said valve element;

said restricted outlet being higher than said unrestricted outlet such that when said back pressure ceases, said valve element unseats from said unrestricted outlet and fluid within said restricted outlet drains back through said second passage, bypasses said unseated valve element, and passes through said lower unrestricted outlet.

5. A diverter valve as defined by claim 4;

said valve element is an elastomer sleeve rotatably mounted to a flange that is eccentrically positioned with respect to the axis if rotation of said valve body;

said flange being rotatable within said cavity; and said outlets being on the side wall of said cavity and said inlet being at the end thereof.

6. A diverter valve as defined in claim 5 further characterized by:

said flange and sleeve defining a pressure chamber in communication with said first passage by means of a pilot hole in said stem; and said sleeve being responsive to the pressure within said pressure chamber such that above a predetermined pressure, said sleeve radially moves to close the unrestricted outlet.

7. A diverter as defined in claim 3 further characterized by:

said valve body having a second passage communicating said restricted outlet with said valve element;

said restricted outlet leading to a conduit that is higher than said unrestricted outlet such that when said back pressure ceases, said valve element unseats from said unrestricted outlet and fluid within said conduit drains back through said second passage, bypasses said unseated valve element and passes through to the unrestricted outlet.

8. A diverter valve as defind in claim 7 wherein:

said valve element is an elastomeric sleeve rotatably mounted to a flange that is eccentrically positioned with respect to the axis of rotation of said valve body;

said flange being rotatable within said cavity; and said outlets being on the side wall of said cavity and said inlet being at the end thereof.

9. A diverter valve characterized by:

a housing having a cavity with an inlet, an unrestricted outlet, and restricted outlet;

a valve body having a valve element, a jet means, and a first passage communicating said inlet to said jet means;

said valve body movable within said cavity to a first position such that said jet means is adjacent said unrestricted outlet and said valve element is adjacent said restricted outlet, said inlet being able to pass fluid through said first passage, and said jet means shooting fluid therethrough into said unrestricted outlet and creating a low pressure area adjacent said unrestricted outlet;

a second passage communicating said restricted outlet to said unrestricted outlet for allowing air to aspirate to said unrestricted outlet from said restricted outlet to aerate water passing into said unrestricted outlet.

10. A diverter valve as defined in claim 9 wherein;

said restricted outlet is operably connected to a conduit that is higher than said unrestricted outlet such that when pressure within said cavity is below a predetermined amount said valve body is in said second position, said valve element breaks its seal from said unrestricted outlet and fluid within said conduit drains therefrom through said restricted outlet, said second passage, by said valve element, and out through said unrestricted outlet.

11. A diverter valve as defined by claim 10 wherein;

said valve element is an elastomeric sleeve rotatably mounted about a flange that is eccentrically positioned with respect to the axis of rotation of said stem;

12. A diverter valve as defined in claim 11 further characterized by:

said flange and sleeve defining a pressure chamber in communication with said first passage by a pilot hold in said stem;

said sleeve being responsive to the pressure within said pressure chamber such that above a predetermined pressure, said sleeve radially moves to close the unrestricted outlet.

13. A diverter valve characterized by:

a housing having a cavity with a first unrestricted outlet, a second restricted outlet, and an inlet;

a valve element movably mounted in said cavity between a first position and second position;

said valve element being an elastomeric sleeve rotatably mounted about a valve seat;
said valve seat being operably rotatable within said cavity;
said outlets being through the side wall of said cavity and said inlet being at an end thereof; and
said valve member when in said first position being adjacent said first unrestricted outlet and being pressure responsive to fluid pressure in said cavity such that over a predetermined pressure in said cavity, said sleeve seals said first unrestricted outlet and fluid is directed through said second outlet from said inlet and when fluid pressure in said cavity is below a predetermined amount, said valve element breaks its seal with said first unrestricted outlet and allows fluid communication between the two outlets to provide drainage from said housing cavity.

* * * * *